A. GLUD.
SANITARY EVAPORATING GARBAGE CAN.
APPLICATION FILED MAY 1, 1918.

1,331,428.

Patented Feb. 17, 1920.

Inventor
Annie Glud

UNITED STATES PATENT OFFICE.

ANNIE GLUD, OF OAKLAND, CALIFORNIA.

SANITARY EVAPORATING GARBAGE-CAN.

1,331,428.  Specification of Letters Patent.  Patented Feb. 17, 1920.

Application filed May 1, 1918. Serial No. 231,977.

*To all whom it may concern:*

Be it known that I, Mrs. ANNIE GLUD, a citizen of the United States, residing at 1120 Oak street, Oakland, county of Alameda, State of California, have invented Sanitary Evaporating Garbage-Cans; and I hereby declare the following to be a full, clear, and exact description of the same.

Figure 1:
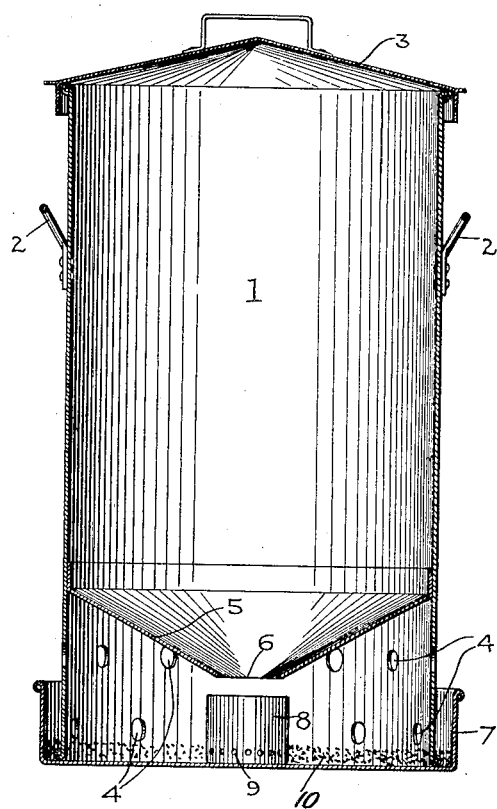
Figure 2:
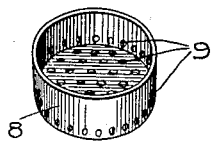

This invention relates to improvements in garbage cans,—the principal object being to provide a sanitary and odorless can for the purpose. I have illustrated my idea in the accompanying drawing in which:

Figure 1 is a cross-section of the can and its accompanying parts, and Fig. 2 is a perspective view of the disinfectant holder.

Describing the can more fully, 1 represents the body of the can, having the usual side handles 2 and the usual cover 3. Near the bottom are two rows of holes 4, while secured inside and above said holes is a downwardly pointing funnel 5, terminating in an orifice 6. The can 1 rests in a pan 7, of slightly larger diameter than said can 1, having sides of any suitable height. Resting on this pan is placed a small tin 8, having a plurality of small holes 9 both in the bottom and around the outside near the bottom as shown, said tin being of somewhat larger diameter than the orifice 6 in the funnel 5, and the sides extending up to within a short distance of said orifice 6.

The working of the device is as follows: The garbage is dumped in the can as usual. The accompanying liquids of various kinds of which there are always a quantity present, instead of remaining in the bottom of the can and rotting it, drain down into the orifice 6, and thence into tin 8, which is filled with chlorid of lime, which takes the odor away, the pan being filled with sawdust 10 which absorbs the liquids and evaporates them. The liquids seep through this powder, and out into the main retaining pan 7, through the holes 9 in tin 8, being emptied therefrom when convenient, there being then no odors or injurious qualities remaining in said liquids. The can and its parts are, of course, preferably made of some non-rusting material, such as galvanized iron, and of any size desired.

I claim as new and wish to cover by Letters Patent.

1. A garbage can, the combination of a body and a cover therefor, a bottom inclined downwardly toward a common point, said bottom having its lowest point above the lower edge of said body and having an opening at its lowest point, an open pan in which said can is adapted to rest, a container positioned under said opening in said pan, a disinfectant in said container and an absorbent material in said pan.

2. A garbage can comprising in combination with a can body and a cover therefor, a bottom adapted to drain liquids to a common point, an open receptacle for an absorbent material, a container for a disinfectant material adapted to receive the liquid from said can and discharge it into said absorbent material, said body having air holes below said bottom.

3. A garbage can comprising a body, a bottom having a drainage outlet, an open receptacle for an absorbent material below said can, said body having air openings below the point at which the bottom is attached and means for holding disinfectant material so that liquids from said can will pass through said material and be discharged in said absorbent material.

ANNIE GLUD.

Witnesses:
I. G. KAUFFMAN,
J. N. TURNER.